(12) United States Patent  (10) Patent No.: US 8,115,403 B2
Kostrun et al.  (45) Date of Patent: Feb. 14, 2012

(54) METHOD OF STARTING AN HID LAMP AND BALLAST INCORPORATING SAME

(75) Inventors: Marijan Kostrun, Tolland, CT (US); Helmar Adler, Danvers, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 417 days.

(21) Appl. No.: 12/542,963

(22) Filed: Aug. 18, 2009

(65) Prior Publication Data

US 2011/0043119 A1    Feb. 24, 2011

(51) Int. Cl.
*H05B 41/04*    (2006.01)
(52) U.S. Cl. .................................. 315/209 T; 315/291
(58) Field of Classification Search .............. 315/209 T, 315/246, 268, 287, 291, 307
See application file for complete search history.

(56) References Cited

U.S. PATENT DOCUMENTS

| 4,379,982 A * | 4/1983 | Proud ............................. 315/73 |
| 2003/0090215 A1 | 5/2003 | Beasley |
| 2003/0173910 A1 | 9/2003 | Suzuki |
| 2011/0127926 A1 * | 6/2011 | Samejima et al. ............ 315/291 |

FOREIGN PATENT DOCUMENTS

| JP | 10-106785 | 4/1998 |
| JP | 11-162684 | 6/1999 |
| JP | 2004-039391 | 2/2004 |
| JP | 2004-342327 | 12/2004 |

OTHER PUBLICATIONS

R. A. Wijsman, Breakdown Probability of a Low Pressure Gas Discharge, Physical Review, 1949, pp. 833-838, vol. 75, American Physical Society, College Park MD.
R. V. Hodges, R. N. Varney and J. F. Riley, Probability of electrical breakdown: Evidence for a transition between the Townsend and streamer breakdown mechanisms, Physical Review A, 1985, pp. 2610-2620, vol. 31, American Physical Society, College Park MD.
G. Woolsey and D. Ogle, Statistical time lags in low—pressure SF6 breakdown, Journal of Applied Physics, 1989, p. 2920, vol. 66, American Institute of Physics, College Park MD.
J. Dutton, edited by J. M. Meek and J. D. Craggs, Electrical Breakdown of Gases, 1978, pp. 208-318, Wiley-Interscience, Chichester.
A. J. Davies and C. J. Evans, The Theory of Ionization Growth in Gases Under Pulsed and Static Fields, Tech. Rep. CERN 73-10, CERN, Geneva, Switzerland, 1973.

* cited by examiner

*Primary Examiner* — Don Le
(74) *Attorney, Agent, or Firm* — Robert F. Clark; Andrew Martin

(57) ABSTRACT

There is provided herein a method for starting a high intensity discharge lamp and a ballast incorporating the same. In a preferred embodiment, the method comprises the steps of: (a) obtaining a cumulative probability function of breakdown times, $P(t)$, for the lamp at a voltage, V; (b) determining a minimum pulse length, $T_p$, for a selected probability of ignition, $P_{ign}$; (c) if the lamp is operable at the minimum pulse length, then operating the lamp with a DC pulse having a duration $T_p$ and voltage V; (d) or alternatively, if the lamp is not operable at the minimum pulse length, then determining a relaxation time, $T_{rel}$, for a burst mode, selecting a probability of ignition per burst, $P_b$, calculating a minimum number of pulses, $n_p$, in a burst, determining a number of bursts, $N_b$, for the selected probability of ignition, and operating the lamp in the burst mode with $N_b$ bursts separated by relaxation time, $T_{rel}$, with each burst having $n_p$ pulses of voltage V.

16 Claims, 5 Drawing Sheets

METHOD OF STARTING AN HID LAMP AND BALLAST INCORPORATING SAME

TECHNICAL FIELD

This invention relates to methods of starting high intensity discharge (HID) lamps and ballasts for operating such lamps. More particularly, this invention relates to metal halide lamps and electronic ballasts for operating same.

BACKGROUND OF THE INVENTION

The existing theory of discharge breakdown is based on the constant rate paradigm by which the cumulative breakdown probability P(t), i.e., the probability that the breakdown occurred for t' such that $0 \leq t' \leq t$, is given by $$P(t) = \begin{cases} 0, & \text{for } t \leq t_0, \\ 1 - \exp(-r(t - t_0)), & \text{for } t > t_0, \end{cases}$$

with r being a time-independent breakdown rate, and $t_0$ being a minimal breakdown time. The breakdown rate is further expanded as $r = \dot{n} \cdot p$ where $\dot{n}$ is the rate of appearance of eligible electrons at the cathode, while p is the probability that these electrons create an avalanche leading to breakdown. For high intensity discharge (HID) lamps p is of secondary importance because HID lamps are typically overvoltaged to insure ignition, meaning that for all practical purposes p≡1.

The ignition voltage is significantly greater than the operating voltage of the lamp and requires a special igniter circuit that has to be designed and incorporated into the ballast. As the ignition voltage of individual lamps may vary, the circuit must be designed to handle a range of values. A standard igniter uses a brute force approach to start a lamp: a long sequence of ignition pulses is applied in expectation that the lamp will eventually ignite. This approach limits the design parameters for the ballast electronics which supply and manage the ignition voltage and the power used to ignite and then operate the lamp. Lowering the ignition voltage would lead to less expensive and more compact ballasts if it could be achieved while maintaining reliable starting of the lamp.

SUMMARY OF THE INVENTION

It is an object of the invention to obviate the disadvantages of the prior art.

It is a further object of the invention to provide a reliable means of starting high intensity discharge lamps at lower ignition voltages.

In accordance with an object of the invention, there is provided a method for starting an HID lamp using an igniter circuit, comprising the steps of:
(a) obtaining a cumulative probability function of breakdown times, P(t), for the lamp at a voltage, V;
(b) determining a minimum pulse length, $T_p$, for a selected probability of ignition, $P_{ign}$;
(c) if the lamp is operable at the minimum pulse length, then operating the lamp with a DC pulse having a duration $T_p$ and voltage V;
(d) or alternatively, if the lamp is not operable at the minimum pulse length, then determining a relaxation time, $T_{rel}$, for a burst mode, selecting a probability of ignition per burst, $P_b$, calculating a minimum number of pulses, $n_p$, in a burst, determining a number of bursts, $N_b$, for the selected probability of ignition, and operating the lamp in the burst mode with $N_b$ bursts separated by relaxation time, $T_{rel}$, with each burst having $n_p$ pulses of voltage V.

In accordance with another object of the invention, there is provided a ballast for operating a high intensity discharge lamp, the ballast having an igniter circuit and an igniter control circuit, the igniter circuit generating voltage pulses having a magnitude V, duration $T_1$, and spaced $T_2$ apart, the igniter control circuit repeatedly causing the igniter circuit to apply bursts of the voltage pulses to the lamp by cycling the igniter circuit on for a period of about $n_p \cdot (T_1 + T_2)$ where $n_p$ is a minimum number of pulses for a selected probability of ignition per burst and then off for a relaxation time of $T_{rel}$, the igniter control circuit repeating the cycle until a first breakdown in the lamp.

In accordance with a further object of the invention, there is provided a ballast for operating a high intensity discharge lamp, the ballast having an igniter circuit and an igniter control circuit,
  the igniter control circuit obtaining a cumulative probability function of breakdown times, P(t), for the lamp by repeating causing the igniter circuit to apply a fast-rise DC voltage pulse of magnitude V to the lamp and then measuring and storing a breakdown time, $T_B$, for each voltage pulse applied;
  the igniter control circuit using the cumulative probability function of breakdown times to determine a minimum pulse length, $T_p$, for a preselected probability of ignition, $P_{ign}$;
  the igniter control circuit determining if the lamp is operable at the minimum pulse length, and then, if the lamp is operable at the minimum pulse length, operating the lamp by causing the igniter circuit to apply to the lamp a DC pulse having a duration $T_p$ and voltage V;
  or alternatively, if the lamp is not operable at the minimum pulse length, the igniter control circuit determining a relaxation time, $T_{rel}$, for a burst mode, calculating a minimum number of pulses, $n_p$, in a burst for a preselected probability of ignition per burst, $P_b$, determining a number of bursts, $N_b$, for the preselected probability of ignition, $P_{ign}$, and causing the igniter circuit to operate the lamp in the burst mode with $N_b$ bursts separated by relaxation time, $T_{rel}$, with each burst having $n_p$ pulses of voltage V.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Figure 1:
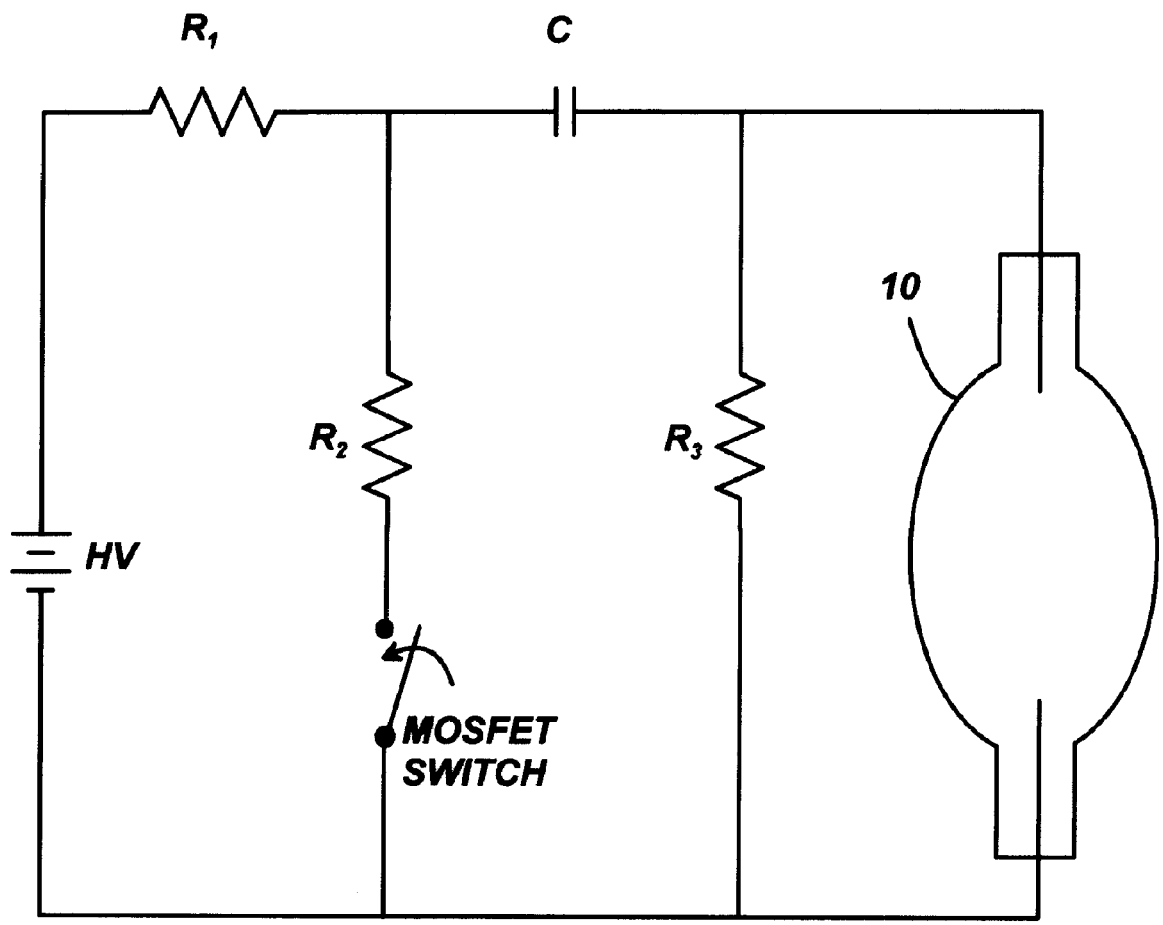
FIG. 1 is a diagram of an igniter circuit for generating DC-voltage pulses for initiating discharge breakdown in a lamp.

In a preferred embodiment, the present method relies on defining a cumulative probability function of breakdown times obtained by performing a number of ignition attempts at a specific starting voltage, V, and measuring the time it takes for each attempt to initiate breakdown. The igniter circuit used to produce DC-voltage pulses is shown in FIG. 1. The capacitor C is charged to the potential of the high voltage supply, HV, allowing it to discharge through resistor $R_2$. The values of $R_2$ and C are chosen so that the capacitor-discharge time scale (milliseconds) is much larger than the average statistical lag times (microseconds). For example, $R_2$ may be 1200Ω and C 150 pF. For $R_1$ and $R_3$, typical values would be on the order of several MΩ and a few kΩ, respectively. In each attempt, a fast-rise voltage pulse (preferably a 20 to 50 ns rise time) is applied to the lamp 10 by triggering the MOSFET switch and the current and voltage waveforms are measured with an oscilloscope, where recording of the waveforms is triggered by the rising edge of the voltage pulse. Following triggering the oscilloscope records the current and voltage waveforms for a predetermined time interval, e.g., 10-20 μs. The MOSFET switch is triggered again after allowing for a rest period, e.g. 5 seconds, between attempts. This cycle is repeated numerous times until a statistically sufficient number of attempts are recorded, preferably about 1000-5000 attempts.

Figure 2:
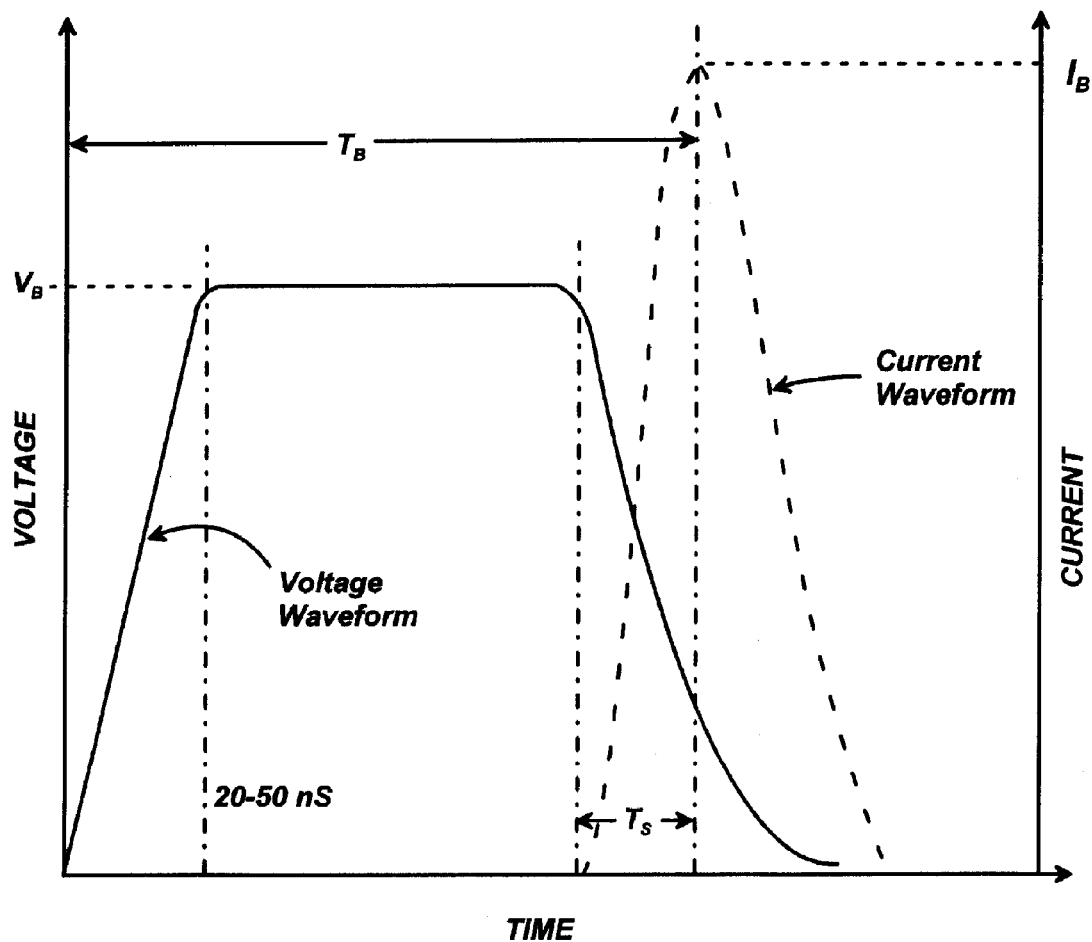
FIG. 2 is a graphical illustration of current and voltage waveforms from which the breakdown parameters are extracted.

From the current and voltage waveforms (FIG. 2), the following breakdown parameters are extracted: (1) the breakdown time, $T_B$, the time elapsed from the beginning of the voltage pulse to the time when the breakdown current reaches its maximum value; (2) the breakdown current, $I_B$, the maximum current measured for a duration of the breakdown; (3) the current growth time, $T_S$, the time elapsed from the moment the voltage starts to drop to the moment the current peaks; and (4) the breakdown voltage, $V_B$, the voltage value at the start of the rise of the breakdown current, $I_B$. From the measured breakdown times, $T_B$, a cumulative probability function, P(t), is obtained.

The cumulative probability function, P(t), represents the cumulative probability of breakdown for the lamp and is defined as:

$$P(t) = \frac{1}{N} \sum_{i=1}^{M} \theta(t - t_i)$$

where $\theta = \theta(t)$ is the Heaviside function given by $\theta(t)=0$ for t<0, $\theta(t)=0.5$ for t=0, and $\theta(t)=1$ for t>0, N is the number of attempts, and M is the number of successful ignitions that occurred at times, $t_i$. The probability density function, p(t), follows from $$p(t) = \frac{d}{dt} P(t).$$

After the breakdown probability density function, p=p(t), is determined, one has to select a desired ignition probability, $P_{ign}$, for the particular lamp or lamp type. Typically, $P_{ign}$ is selected to be as high as possible with the reach of the lamp/igniter combination, preferably at least 95% and more preferably at least 99%. Once selected, it is possible to determine the minimum pulse length needed to ignite the lamp at the specified starting voltage, V.

Using the breakdown probability density function, p(t), the minimum pulse length $T_p$ is chosen so that the breakdown probability during that time is greater than the selected $P_{ign}$, $$\int_0^{T_p} dt \, p(t) \geq P_{ign}.$$

Obviously, $P_{ign} = P_{ign}(V, T_p)$, where for constant $P_{ign}$ increasing of V leads to decreasing of $T_p$, and conversely, decreasing of V leads to increase of $T_p$, which may become substantial as the minimum ignition voltage is approached.

Given the limitations of the ballast and the desired $P_{ign}$ for low ignition voltages, it might not be possible to create an ignition pulse of the necessary minimum length, $T_p$. In such cases bursts of pulses should be used to ignite the lamps.

The parameters of the burst are: V, voltage of the pulses; $T_1$, the length of a single pulse, $T_2$, the pause between two consecutive pulses in the burst; and $T_{rel}$, the relaxation time which is the interval between consecutive bursts. The three times are typically related as $T_{rel} >> T_1 \geq T_2$.

Figure 3:
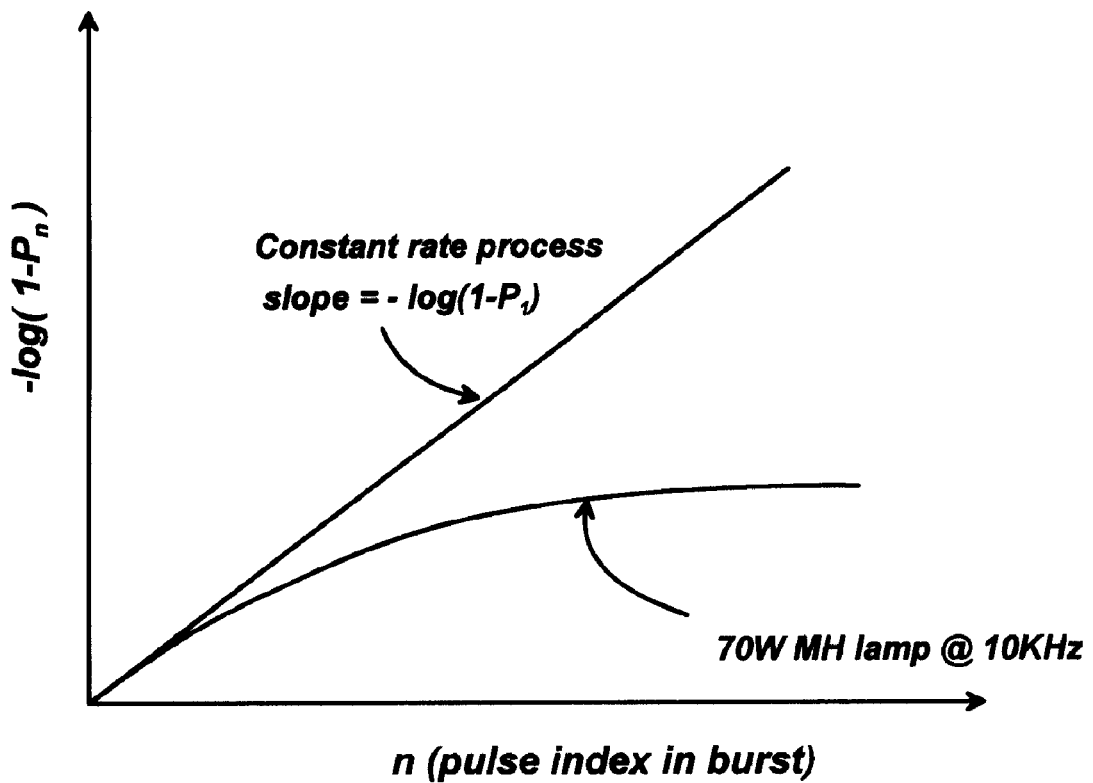
FIG. 3 is a graphical illustration of the decreasing probability of ignition that occurs for each subsequent pulse in a burst of pulses.

It has been found that repeated ignition attempts cause detrimental conditions to set up inside the lamp which lower the probability of ignition with each subsequent pulse within the burst. The relaxation time between bursts is needed to allow these detrimental conditions to relax so that the probability of ignition for each subsequent burst is returned to approximately the high value that the lamp had in its initial state. This effect is illustrated in FIG. 3 wherein the probability of ignition is shown decreasing for each subsequent pulse index, n, in a burst. Ideally, this should be a constant rate process as shown by the straight line in FIG. 3. However, in actual lamps, this rate has been observed to decrease progressively as exemplified in the curve for the 70 W metal halide (MH) lamp which falls below the constant rate line.

$T_1$ and $T_2$ are dependent on the characteristics of the selected ballast. $T_1$ needs to be greater than the minimum breakdown time needed to ignite the lamp. $T_2$ is dictated by the properties of the ballast circuitry. Both values are on the order of 1-2 μs.

Given $T_p$ for a chosen voltage V and a chosen probability of breakdown per single burst, $P_b = P_b(V, T_p)$, the number of pulses in the burst, $n_p$, is at least $T_p/T_1$. With $P_{ign}$ as the desired probability of breakdown as before, the number of bursts $N_b$ is given by $$N_b \sim \frac{\log(1 - P_{ign})}{\log(1 - P_b)}.$$

This formula is valid only if $T_{rel}$ is sufficiently long so that p(t), instead of continuing at a current time t, starts from zero, i.e., $p(t) \cong p(t - T_{rel})$. This is determined by empirically varying $T_{rel}$ until the breakdown probability per burst essentially no longer decreases with the index of the burst.

Figure 4:
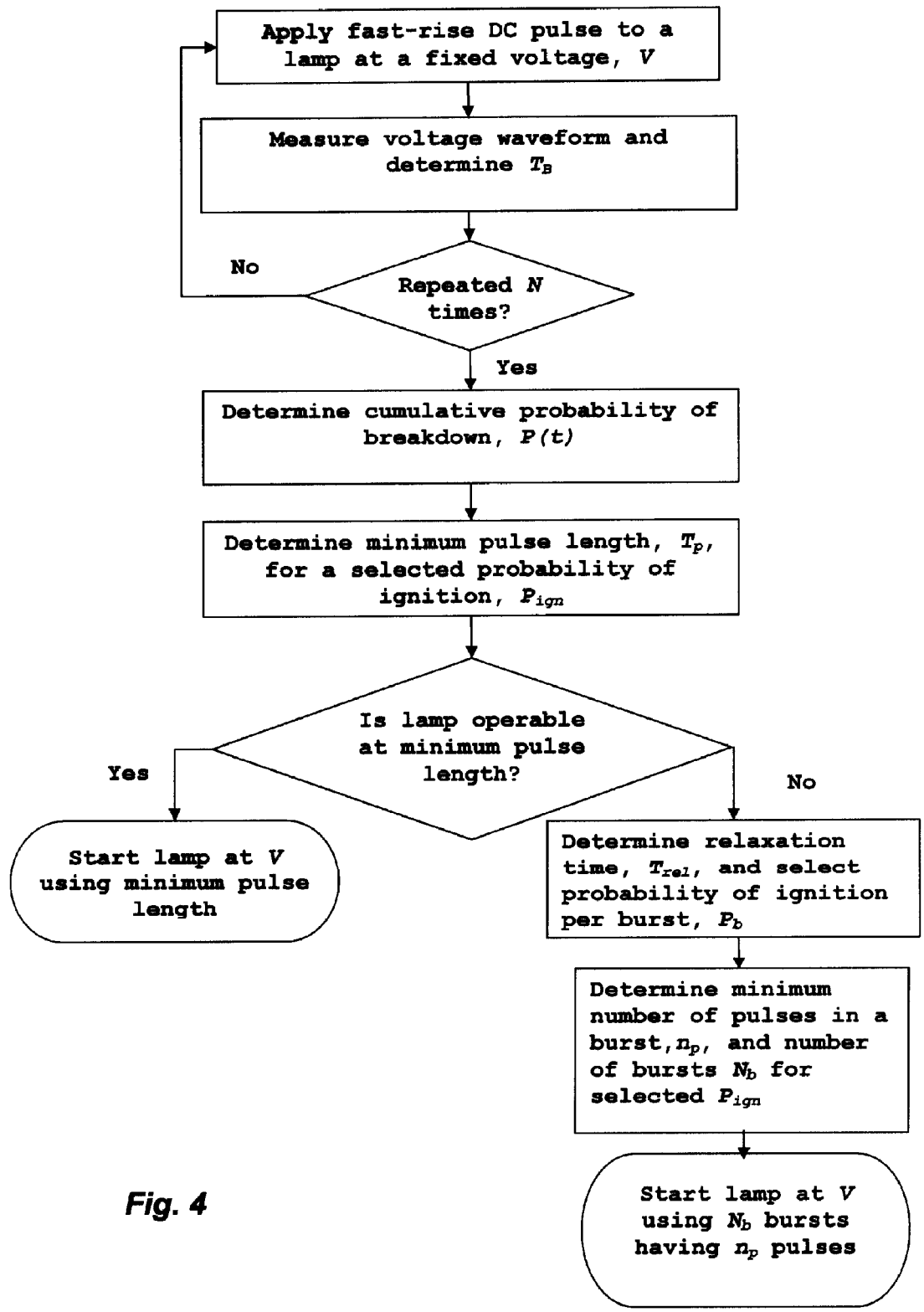
FIG. 4 is a graphical illustration of the method of this invention shown as a flow chart.

FIG. 4 is a graphical illustration of the method of this invention shown as a flow chart. The first two steps, applying a fast-rise DC pulse and waveform measurements, are repeated N times, where N is preferably about 1000 to about 5000. Once the N-th repetition is reached, the cumulative probability function of breakdown times, P=P(t), and its derivative, the probability density function, p=p(t), are calculated. From the latter, a minimum pulse width is calculated based on a selected probability of ignition. At this point, a decision is reached regarding whether it is possible to ignite the lamp at the minimum pulse length at the fixed voltage V. If it is possible, the lamp is ignited using these conditions. If it is not possible, another series of steps are taken to determine the parameters for using bursts of pulses to ignite the lamp.

Here, the relaxation time $T_{rel}$ is first determined as described above and then a probability of ignition, $P_b$, is selected for each burst. The minimum number of pulses, $n_p$, for each burst is then determined followed by the number of bursts $N_b$ for the selected $P_{ign}$. At this point, the lamp is ignited at the fixed voltage V using $N_b$ bursts separated by $T_{rel}$, with each burst having at least the minimum number of pulses $n_p$.

Figure 5:
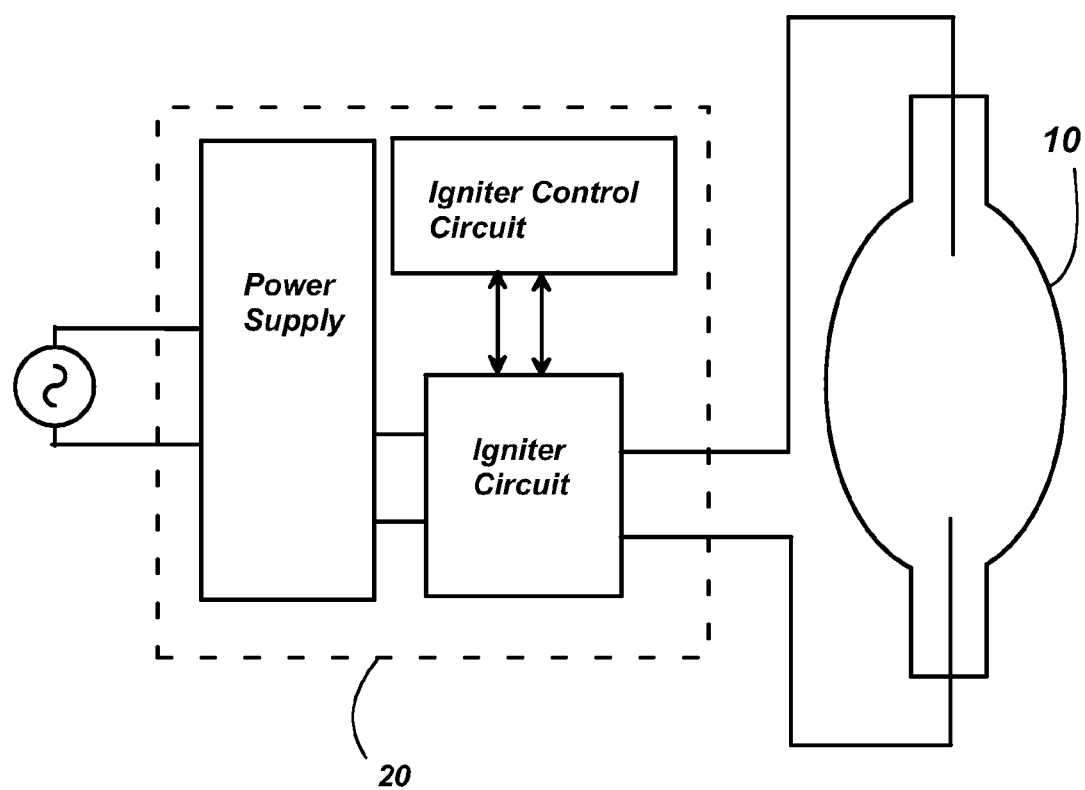
FIG. 5 is a schematic illustration of the method of this invention implemented in an electronic ballast.

With reference to FIG. 5, the method of this invention may be implemented in an electronic ballast 20 as follows. The electronic ballast 20 containing a power supply for operating lamp 10 further requires an igniter circuit which produces the voltage pulses of magnitude V, duration $T_1$, and spaced $T_2$ apart. Additionally, the ballast incorporates an igniter control circuit which turns on the igniter circuit for a duration of time $n_p \cdot T_1 + (N_1-1) \cdot T_2 \sim n_p \cdot (T_1+T_2)$ and then it turns off for a duration of time $T_{rel}$. The control circuit repeats the cycle until the first breakdown after which the igniter circuit should be switched to a continuous pulse mode having pulses of duration $T_1$ spaced $T_2$ apart. The single burst mode may be continued for the remainder of the takeover phase until the establishment of a thermionic arc, after which the igniter is shut down completely and the lamp operates normally on the ballast.

While there have been shown and described what are at present considered to be preferred embodiments of the invention, it will be apparent to those skilled in the art that various changes and modifications can be made herein without departing from the scope of the invention as defined by the appended claims.

We claim:

1. A method for starting an HID lamp using an igniter circuit, comprising the steps of:
    (a) obtaining a cumulative probability function of breakdown times, P(t), for the lamp at a voltage, V;
    (b) determining a minimum pulse length, $T_p$, for a selected probability of ignition, $P_{ign}$;
    (c) if the lamp is operable at the minimum pulse length, then operating the lamp with a DC pulse having a duration $T_p$ and voltage V;
    (d) or alternatively, if the lamp is not operable at the minimum pulse length, then determining a relaxation time, $T_{rel}$, for a burst mode, selecting a probability of ignition per burst, $P_b$, calculating a minimum number of pulses, $n_p$, in a burst, determining a number of bursts, $N_b$, for the selected probability of ignition, and operating the lamp in the burst mode with $N_b$ bursts separated by relaxation time, $T_{rel}$, with each burst having $n_p$ pulses of voltage V.

2. The method of claim 1, wherein the igniter circuit is switched to operate in a continuous pulse mode after the lamp ignites in the burst mode.

3. The method of claim 2, wherein the continuous pulse mode continues for the remainder of a takeover phase after which the igniter circuit is shut down.

4. The method of claim 1 wherein the cumulative probability function of breakdown times is obtained by repeatedly applying a fast-rise DC pulse to the lamp at the voltage V and measuring a breakdown time.

5. The method of claim 4 wherein the application of the DC pulse and the measurement of the breakdown time is repeated for between about 1000 to about 5000 times.

6. The method of claim 1 wherein the selected probability of ignition is at least 95%.

7. The method of claim 1 wherein the selected probability of ignition is at least 99%.

8. A ballast for operating a high intensity discharge lamp, the ballast having an igniter circuit and an igniter control circuit, the igniter circuit generating voltage pulses having a magnitude V, duration $T_1$, and spaced $T_2$ apart, the igniter control circuit repeatedly causing the igniter circuit to apply bursts of the voltage pulses to the lamp by cycling the igniter circuit on for a period of about $n_p \cdot (T_1+T_2)$ where $n_p$ is a minimum number of pulses for a selected probability of ignition per burst and then off for a relaxation time of $T_{rel}$, the igniter control circuit repeating the cycle until a first breakdown in the lamp.

9. The ballast of claim 8, wherein the igniter control circuit switches the igniter circuit to a continuous pulse mode after the first breakdown.

10. The ballast of claim 9, wherein the igniter control circuit turns the igniter circuit off when a thermionic arc is established in the lamp.

11. A ballast for operating a high intensity discharge lamp, the ballast having an igniter circuit and an igniter control circuit,
    the igniter control circuit obtaining a cumulative probability function of breakdown times, P(t), for the lamp by repeating causing the igniter circuit to apply a fast-rise DC voltage pulse of magnitude V to the lamp and then measuring and storing a breakdown time, $T_B$, for each voltage pulse applied;
    the igniter control circuit using the cumulative probability function of breakdown times to determine a minimum pulse length, $T_p$, for a preselected probability of ignition, $P_{ign}$;
    the igniter control circuit determining if the lamp is operable at the minimum pulse length, and then, if the lamp is operable at the minimum pulse length, operating the lamp by causing the igniter circuit to apply to the lamp a DC pulse having a duration $T_p$ and voltage V;
    or alternatively, if the lamp is not operable at the minimum pulse length, the igniter control circuit determining a relaxation time, $T_{rel}$, for a burst mode, calculating a minimum number of pulses, $n_p$, in a burst for a preselected probability of ignition per burst, $P_b$, determining a number of bursts, $N_b$, for the preselected probability of ignition, $P_{ign}$, and causing the igniter circuit to operate the lamp in the burst mode with $N_b$ bursts separated by relaxation time, $T_{rel}$, with each burst having $n_p$ pulses of voltage V.

12. The ballast of claim 11, wherein the igniter control circuit obtains the cumulative probability function of breakdown times by applying the fast-rise DC pulse about 1000 to 5000 times.

13. The method of claim 11, wherein the igniter control circuit switches the igniter circuit to operate in a continuous pulse mode after the lamp ignites in the burst mode.

14. The method of claim 13, wherein the continuous pulse mode continues for the remainder of a takeover phase after which the igniter circuit is shut down by the igniter control circuit.

15. The method of claim 11 wherein the preselected probability of ignition is at least 95%.

16. The method of claim 11 wherein the preselected probability of ignition is at least 99%.

* * * * *